United States Patent [19]
Buckley et al.

[11] 3,718,516
[45] Feb. 27, 1973

[54] PROCESS FOR PRODUCTION OF INTERLAYER SAFETY-GLASS

[75] Inventors: Francis T. Buckley, Hampden; Raymond F. Kiek, Wilbraham; Donald I. Christensen, East Longmeadow, all of Mass.

[73] Assignee: Monsanto Company, St. Louis, Mo.

[22] Filed: Jan. 11, 1971

[21] Appl. No.: 105,722

Related U.S. Application Data

[63] Continuation-in-part of Ser. No. 683,487, Nov. 16, 1967, Pat. No. 3,556,890.

[52] U.S. Cl. .................156/106, 65/30, 65/111, 156/308, 156/309, 161/125, 161/199
[51] Int. Cl. ....B32b 17/10, B32b 31/12, C03c 17/00
[58] Field of Search......156/106, 308, 309, 313, 307; 161/125, 199, 164; 117/124 A, 124 B, 54; 134/2, 34; 65/30, 111, 116

[56] References Cited
UNITED STATES PATENTS

| | | | |
|---|---|---|---|
| 3,607,178 | 9/1971 | Dennison | 156/106 X |
| 3,389,047 | 6/1968 | Lavin et al | 161/199 |
| 1,791,066 | 2/1931 | Smith | 65/30 X |
| 3,481,726 | 12/1969 | Fischer et al. | 65/30 |
| 3,498,773 | 3/1970 | Grubb et al. | 65/30 |
| 3,556,890 | 1/1971 | Buckley et al. | 156/106 |

*Primary Examiner*—Robert F. Burnett
*Assistant Examiner*—Lorraine T. Kendell
*Attorney*—William J. Farrington, James C. Logomasini, Neal E. Willis and Richard W. Sternberg

[57] ABSTRACT

This invention relates to an improvement in the process for preparing laminated safety-glass wherein glass sheets are washed and then laminated to a poly(vinyl acetal) interlayer, the improvement which comprises adjusting the salt content of the final rinse water for the glass sheets so as to provide a salt content in the range of from 50 to 500 parts per million. The resulting laminates are found to have increased impact strength.

4 Claims, No Drawings

PROCESS FOR PRODUCTION OF INTERLAYER SAFETY-GLASS

CROSS REFERENCE TO RELATED APPLICATION

This application is a continuation-in-part of copending application Ser. No. 683,487, filed Nov. 16, 1967 and now U.S. Pat. No. 3,566,890.

BACKGROUND OF THE INVENTION

1. Field of the Invention

The present invention is related to the field of safety laminates for use in vehicular, architectural and other related applications. More particularly, it is related to laminated safety glass having a plastic interlayer interposed between sheets of glass.

2. Description of the Prior Art

Laminated safety-glass comprises two or more glass sheets bound with an interlayer of a transparent, adherent plastic. The usual glass sheet is plate glass or tempered glass of varying thicknesses. The usual plastic interlayer is a plasticized polyvinyl acetal resin formed in a sheet or film with a thickness of about 0.015 inch or more. The major commercial use of these safety-glass compositions is in architectural applications and for automobile windshields, as well as for windshields in other moving vehicles. The everincreasing number of automobiles and the faster speed of travel today, coupled with the greater area of modern day windshields, has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The glass laminates must be construed so as to minimize the danger of flying glass after impact. In addition, the glass laminate should be capable of absorbing energy on impact at low deceleration levels, thereby decreasing the possibility of skull fracture which may occur when a head strikes the windshield, while also supplying added resistance to penetration.

Improved impact resistance in laminated safety-glass has been obtained by incorporating various additives into the interlayer as described in such U.S. Pat. Nos. as 3,262,835; 3,262,836; 3,249,488 and 3,249,489. Thus, the prior art methods call for incorporating the impact strength increasing additives into the resin or the interlayer.

A need exists for an improved process for increasing the impact strength of liminated safety glass which involves treating the glass members of the laminate instead of incorporating additives into the interlayer.

SUMMARY OF THE INVENTION

The present invention is directed toward an improved process for preparing laminated safety-glass wherein glass sheets are washed and then laminated to a poly(vinyl acetal) interlayer, the improvement which comprises adjusting the salt content of the final rinse water for the glass sheets so as to provide a salt content in the range of from 50 to 500 parts per million. The resulting laminates are found to have increased impact strength.

DESCRIPTION OF THE PREFERRED EMBODIMENTS

The glass laminates described in the following working examples are prepared by interposing 15 mil and 30 mil interlayers between two 12 × 12 × 0.125 inch glass sheets. The glass sheets are scrubbed using brushes and a mild detergent solution, rinsed under tap water at from 10° to 50°C., given a final rinse in distilled water which contains additives which have been found to increase the impact strength of the resulting laminate. The glass sheets are allowed to drain for one hour at room temperature. The resulting laminates are then subjected to a temperature of about 275°F. at a pressure of 185 p.s.i. for approximately 10 minutes to bond the laminate or panels together.

The poly(vinyl butyral) interlayer used in these laminates is regular production material with the following characteristics:

| Thickness | PVOH content | Residual Acetate Content | % Moisture | Titer (1) |
|---|---|---|---|---|
| 15 mils 0.015 inch | 19.0% | 1.3% | 0.4 | 25 ml |
| 30 mils 0.030 inch | 18.9% | 0.8% | 0.43 | 28 ml |

(1) due to potassium acetate.

These particular interlayers are used in the working examples in order to achieve a uniform control. Those skilled in the art will recognize them as merely representative of the poly(vinyl butyral) sheet that can be used in the practice of this invention. As is obvious to those skilled in the art, there are many grades of poly(vinyl butyral) that can be used as interlayer material. These will be set forth in greater detail below.

The glass sheets used are standard polished plate glass which is well known and widely used in the automotive and aeronautical glass laminating industry. However, the present invention is not to be construed as being limited to this type glass as will be pointed out below.

The laminates prepared by the above procedure are then subjected to Mean Break Height tests according to the recently established tentative specifications set up by the Society of Automotive Engineers, the Subcommittee on Automotive Glazing and the results reported below.

In essence, the Mean Break Height test comprises placing the laminate in a horizontal position with a frame or edge support and while maintaining a constant laminate temperature, which is 70°F. in this series, allowing a 5 pound steel ball to drop from a designated height against approximately the middle of the laminate. This test is repeated at increasing ball-drop heights to determine the approximate height in feet at which 50 percent of the laminates tested will resist penetration. In other words, the Mean Break Height of a laminate is a measure of the ability of that laminate to absorb the energy of an impacting object. In the present invention an increase in the Mean Break Height is considered to be an increase in the impact strength of the laminate.

The following Examples 1 to 8 are set forth to illustrate the present invention and are not intended as limitations thereof. The glass laminates are prepared according to the procedures set forth above. The final rinse water used on the glass sheets contains the additives listed in the following Table 1 and are introduced onto the surface of the glass sheets during the rinsing step. These treated surfaces are then laminated to the poly(vinyl butyral) interlayer.

TABLE 1

SUMMARY OF EXAMPLES 1 to 6

| Exa. | Rinse Water Additive | Amount (PPM) (1) | Mean Break Height (ft.) 70°F. Interlayer Thickness 30 Mil | 15 Mil |
|---|---|---|---|---|
| 1 | Control | None | 8.0 | 2.4 |
| 2 | Na$_2$CO$_3$ | 50 | 13.5 | 3.7 |
| 3 | " | 110 | 17 | — |
| 4 | MgCo$_3$ | 150 | 20.3 | 7.3 |
| 5 | CaCO$_3$ | 500 | 17.1 | — |
| 6 | MgSO$_4$ | 150 | 14.6 | 3.5 |

(1) Amount of additive used to increase impact strength present in final rinse water calculated as parts per million (PPM).

The data in the foregoing Table 1 illustrates the surprising increase in impact resistance that is obtained in the practice of this invention wherein an additive is added to the final rinse water in order to obtain an increase in the impact strength of the laminate. Note that the control, wherein the rinse water contains no additive, has the lowest Mean Break Height of those samples tested. On the other hand, the laminates prepared using the glass sheets that had been rinsed in water containing an increased impact strength additive undergo a significant increase in impact strength as indicated in the Mean Break Height. Note further that the realized improvement is obtained with both the 15 and the 30 mil interlayers.

EXAMPLE 7

Example 3 is repeated here except that potassium acetate is used in the final rinse water as the additive to increase impact strength. Comparable results are obtained.

EXAMPLE 8

Example 3 is repeated here except that zinc fluoride is used in the final rinse water as the additive used to increase impact strength. Comparable results are obtained.

The polyvinyl acetal resins which are employed in the present invention are described in detail in U.S. Pat. No. 3,249,489 which is incorporated herein by reference.

The glass employed in the present invention may be regular plate glass, polished plate glass, or float glass, etc. of varying thickness. In addition, this invention also contemplates using fully or semi-heat tempered or chemically tempered glass of varying thickness. Some applications may require a clear, rigid or semi-rigid plastic coverplates such as poly(methyl methacrylate) instead of the traditional glass coverplate.

The additives used to increase glass laminate impact strength in the practice of this invention are well known to those skilled in the interlayer-safety-glass art. These additives are described in such patents as U.S. Pat. Nos. 2,496,480; 3,231,461; 3,249,488; 3,249,489; 3,249,490; 3,262,835; 3,262,836; 3,262,837; 3,271,233; 3,271,234 and 3,271,235. Examples of these materials which may be used in the practice of this invention to increase the impact strength of glass laminates include:

A. alkali and alkaline earth metal salts and bases such as calcium carbonate, magnesium sulfate, sodium carbonate, potassium fluoride, sodium hydroxide, etc.

B. metal salts of monocarboxylic organic acids containing from one to 22 carbon atoms such as potassium acetate, sodium formate, lithium propionate, magnesium butyrate, zinc stearate, sodium isobutyrate, cadmium acetate, cupric acetate, aluminum acetate, lead acetate, manganese acetate, etc.

C. metal salts of dicarboxylic organic acids containing from four to nine carbon atoms such as potassium succinate, potassium glutarate, sodium adipate, etc.

D. fluoride salts such as the fluoride slats of alkali metals, calcium, antimony, beryllium, cadmium, germanium, silver, tin zinc, fluorosilicates and fluoroborates.

E. organic acids such as monocarboxylic acids of from six to 22 carbon atoms, dicarboxylic acids of from 4-12 carbon atoms, aliphatic monoamino monocarboxylic acids of from two to six carbon atoms, aliphatic monoamino dicarboxylic acids of from four to five carbon atoms, citric acid and mixtures thereof.

F. halogen, aryl, alkyl and amino derivatives of acetic and propionic acids and salts of these acids such as potassium chloroacetic acid, potassium phenoxyacetate, alanine, etc.

G. alkali and alkaline metal salts of aromatic acids such as benzoic acid, phthalic acid, etc.

H. mixtures of the foregoing.

The process set forth in this invention contemplates adjusting the salt content of the rinse water for the glass sheets to a level in the range of 50 to 500 parts per million and more preferably from 110 to 500 parts per million. The glass is then dipped into the rinse water. Alternately, the rinse water is sprayed onto or otherwise allowed to flow over the glass sheets. The laminate is then prepared such that the treated side of the glass sheet is in laminated contact with the interlayer.

It is obvious that many variations may be made in the processes set forth above without departing from the spirit and scope of this invention

What is claimed is:

1. In the process for preparing laminated safety-glass wherein the glass sheets are washed, given a final rinse and then laminated to a poly(vinyl butyral) interlayer, the improvement which comprises adjusting the salt content of the final rinse water for the glass sheets so as to provide a salt content in the final rinse water in the range of from 50 to 500 parts per million wherein the salt is selected from the group consisting of sodium carbonate, potassium acetate and zinc fluoride 2. An improved process as in claim 1 wherein the salt is sodium carbonate.

3. An improved process as in claim 1 wherein the salt is zinc fluoride.

4. An improved process as in claim 1 wherein the salt is potassium acetate.

* * * * *